United States Patent
Eijkhoudt et al.

[11] Patent Number: 6,165,428
[45] Date of Patent: Dec. 26, 2000

[54] PROCESS FOR THE REMOVAL OF METAL CARBONYL FROM A GASEOUS STREAM

[75] Inventors: Roger Eijkhoudt, Bunnik; John Wilhelm Geus, Bilthoven; Cornelis Jacobus Smit, Amsterdam, all of Netherlands

[73] Assignee: Shell Oil Comapny, Houston, Tex.

[21] Appl. No.: 09/349,319

[22] Filed: Jul. 8, 1999

[30] Foreign Application Priority Data

Aug. 7, 1998 [EP] European Pat. Off. ............. 98305411

[51] Int. Cl.[7] .......................... B01D 47/00; B01D 53/02; B01D 59/26
[52] U.S. Cl. .............. 423/210; 95/902; 95/133; 95/116
[58] Field of Search .............. 95/902, 133, 116; 423/210

[56] References Cited

U.S. PATENT DOCUMENTS

| | | | |
|---|---|---|---|
| 4,294,725 | 10/1981 | Fraenkel et al. | 252/455 |
| 4,740,361 | 4/1988 | Heyd et al. | |
| 5,026,673 | 6/1991 | Gates et al. | 502/62 |
| 5,451,384 | 9/1995 | Carr | 423/210 |
| 5,660,800 | 8/1997 | Mieville et al. | 422/173 |
| 6,077,487 | 6/2000 | Snow | 423/210 |

FOREIGN PATENT DOCUMENTS

| | | |
|---|---|---|
| 106409 | 6/1974 | German Dem. Rep. |
| 1039534 | 9/1983 | U.S.S.R. |
| 94/25142 | 11/1994 | WIPO |

OTHER PUBLICATIONS

Golden et al, Removal of Trace Iron and Nickel Carbonyls by Adsorption, Ind. Eng. Chem. Res, 1991.

Golden et al.: "Removal of Trace Iron and Nickel Carbonyls by Adsorption", Ind. Eng. Chem. Res., vol. 30, Oct. 18, 1991, pp. 502–507.

*Primary Examiner*—Tom Dunn
*Assistant Examiner*—Jonas N. Strickland

[57] ABSTRACT

A process is provided for the removal of metal carbonyl from gaseous streams in the presence of hydrogen sulphide and/or water using a hydrophobic porous adsorbent with an accessible pore volume for pore sizes between 0.55 and 4 nm of at least 0.005 ml/g.

12 Claims, No Drawings

PROCESS FOR THE REMOVAL OF METAL CARBONYL FROM A GASEOUS STREAM

The present invention relates to a process for the removal of metal carbonyl from a gaseous stream such as synthesis gas using an adsorbent.

The presence of metal carbonyls in synthesis gas which is used as feedstock for industrial processes catalysed by catalysts, poses severe problems. The catalysts can be poisoned by metal carbonyls or their decomposition products and as a consequence perform less. During the production of synthesis gas from the partial oxidation of hydrocarbon containing material such as natural gas, oil and coal in a gasification plant, not only carbon monoxide and hydrogen are formed but also amounts of hydrogen sulphide and, albeit in smaller quantities carbonyl compounds of nickel and iron. Under conditions prevailing in gasification plants carbon monoxide can react with iron and nickel surfaces and with iron and nickel present in the feed of the process to give the corresponding metal carbonyls. Iron carbonyl is often formed by the reaction of carbon monoxide with steel materials in the process equipment. Also metal carbonyls can be formed when gases are transported or stored in metal containers. Nickel tetracarbonyl and iron pentacarbonyl, especially in combination with hydrogen sulphide, can cause serious problems during treatment of raw synthesis gas, mainly due to thermal and/or chemical carbonyl decomposition. The term "raw synthesis gas" refers to the effluent gas from the gasification reactor consisting mainly of CO and $H_2$ (up to 95 %v), the remainder being water, $CO_2$, $N_2$, hydrogen sulphide and traces of COS, $CH_4$ and $NH_3$. Synthesis gas produced using steam-methane reforming or autothermal reforming instead of using oil or coal gasification, may also be treated similarly as the raw synthesis gas produced by gasification is treated.

Pressure build-ups downstream from the gasification reactor may occur, as metal (sulphide) is being deposited on catalysts used in synthesis gas treating processes, such as COS hydrolysis and the water shift reaction. The term "water shift reaction" refers to the conversion of CO and $H_2O$ to $H_2$ and $CO_2$, i.e. the catalytic reaction between carbon monoxide and water in which each molecule of carbon monoxide is replaced by a molecule of hydrogen according the following equation $CO+H_2O \rightarrow H_2+CO_2$. This reaction is also referred to as "the CO Shift Conversion". Also in Claus plants metal carbonyls can cause problems. For example, if cryogenic methanol is used as a liquid adsorbent for the removal of acid gases, such as hydrogen sulphide and carbon dioxide (as in the Rectisol process) in combination with the Claus plant, deposition of metal oxides and/or metal sulphides can be expected throughout the Claus plant. Part of the carbonyls that cannot be converted by the treating process (e.g. the Rectisol process or other treating processes such as the Selexol process, the Purisol process or the Sulfinol process) will enter the Claus process and gives iron sulphide and nickel sulphide formation in the first catalyst bed. Furthermore in the treating processes as mentioned before sulphides may be formed giving fouling problems.

The "Claus process" is a process for the manufacture of sulphur from hydrogen sulphide comprising oxidation of part of the hydrogen sulphide to $SO_2$ in a thermal reaction stage, followed by the catalytic reaction of the remaining hydrogen sulphide with the $SO_2$ formed to give elemental sulphur in accordance with the following equation $2H_2S+SO_2 \rightarrow 3S+2H_2O$.

The "Rectisol process" is a process for desulphurisation and removal of $CO_2$. It is a physical washing system which uses cold (cryogenic) methanol (about $-30°$ C.) as its solvent. Both hydrogen sulphide and COS are washed out of the incoming raw synthesis gas with the cold methanol.

The "Sulfinol process" is a process for the removal of, amongst others, hydrogen sulphide and/or $CO_2$, which process is well known to the man skilled in the art and is for example defined and described in Oil & Gas Journal, 89 (33) (1991), pp. 57–59.

The "Purisol process" is a process for the removal of $H_2S$ and to a lesser extent $CO_2$ from natural gas and syngas. A description of the process can be found in Kohl and Riesenfeld "Gas Purification", 4th Ed., Gulf Publ. Comp., Houston, London, Paris, Tokyo 1985 ISBN 0-87201-314-6, p. 851.

Furthermore nickel tetracarbonyl and iron pentacarbonyl are toxic already in low concentrations (MAC value 0.05 ppmv). For these reasons it is important that metal carbonyls can be effectively removed from gaseous streams. Given the fact that during normal operation of a gasification plant several tons of iron carbonyl and nickel carbonyl per year are produced, the metal carbonyl problem is a sizeable one.

U.S. Pat. No. 5451384 describes a process for reducing the content of metal carbonyls in gas streams by contacting the gas stream with lead oxide, PbO, dispersed upon a support. The catalyst poisoning problem of metal carbonyls is extensively discussed therein. As suitable supports for the lead oxide zeolites (crystalline silica aluminas) and aluminas are mentioned. For the removal of $Fe(CO)_5$ from a CO gas PbO/gamma-alumina is used in an example. The pore volume of this adsorbent is 0.42 $cm^3/g$. In an other example $Fe(CO)_5$ is removed from synthesis gas. In this example the same PbO/gamma-alumina is used as adsorbent as the one specified above. In U.S. Pat. No. 5,451,384 it is stated that sulphur will preferably already have been removed from the gas to be treated prior to contact with the metal carbonyl trap. As reason is given the fact that it is known that sulphur compounds such as $H_2S$ will poison the catalyst used in processes downstream of the metal carbonyl trap. Further it is mentioned that certain sulphur compounds will compete with the removal of metal carbonyls from the gas stream.

In Sep. Sci. and Techn. 26 (12), pp. 1559–1574, 1991 (by Bhatt, B. L., et al.) and Ind. Eng. Chem. Res., 30 pp. 502–50, 1991 (by Golden T. C. at al), a process is described for the removal of metal carbonyl from gas, such as synthesis gas, in which the gas is contacted with zeolite. The process described therein is carried out in the absence of hydrogen sulphide.

A method for the removal of iron pentacarbonyl and/or nickel carbonyl from hydrogen sulphide containing gas streams has been described in EP 023911 A2. According to this patent application a gas stream containing hydrogen sulphide up to 5 vol. % is led over a fixed adsorption bed consisting of zinc sulphide and zinc oxide. The adsorption bed reduces the iron carbonyl content of the gas stream by 99%, whereas the nickel carbonyl content of the gas stream is lowered by 77% only. This may indicate a relatively low adsorption capacity for nickel carbonyl and/or a contact time limitation and as a consequence forms a constraint on the use of this adsorbent.

As can be deduced from the prior art, it is very difficult to remove iron pentacarbonyl and nickel tetracarbonyl from gas streams which contain both water and hydrogen sulphide. Further it has been found (ref.: Example 2 hereafter) that porous inorganic substances have relatively low adsorption capacity for metal carbonyl, especially when the raw gas contains water.

It has now also been found that certain non-lead containing hydrophobic porous adsorbents are surprisingly capable of effectively removing metal carbonyls from gaseous streams containing water and/or hydrogen sulphide. For the purpose of this application the term "hydrophobic porous adsorbents" refers to hydrophobic adsorbents which contain micro pores having sizes in the range of 0.55 and 4 nm and which only weakly adsorb water. Suitable hydrophobic adsorbents adsorb less than 25 kg $H_2O$ /100 kg of dry adsorbent (25° C., water vapour pressure 0.1 kPa), more suitably less than 10 kg $H_2O$ /100 kg dry adsorbent. Particularly good results are obtained when between 0.001 and 5 kg $H_2O$/100 kg dry adsorbent is adsorbed, especially between 0.01 and 3 kg $H_2O$ / 100 kg dry adsorbent. Preferably between 0.1 and 2 kg $H_2O$ /100 kg dry adsorbent is adsorbed.

The invention, therefore, provides a process for the removal of metal carbonyl from a gaseous stream containing water and/or hydrogen sulphide using a hydrophobic microporous adsorbent with an accessible pore volume for pore sizes between 0.55 and 4 nm of at least 0.005 ml/g.

It has now further been found that the process is particularly suitable for removing metal carbonyls from gaseous streams containing carbon monoxide. Preferably the microporous material is an oxide and more in particular a Si and/or Al containing zeolite. In an alternative formulation the process of the present invention concerns a process for the removal of metal carbonyl from a gaseous stream containing water and/or hydrogen sulphide using a microporous adsorbent with an accessible pore volume for pore sizes between 0.55 and 4 nm of at least 0.005 ml/g, the microporous material being an oxide and more in particular a Si and/or Al containing zeolite.

The silica/alumina ratio of the zeolite is preferably at least 25 and the accessible pore volume for pore sizes between 0.55 and 2 nm is at least 0.02 ml/g.

In case of the use of a hydrophobic microporous oxide, its structure is preferably selected from the group consisting of CLO, VFI, AET, AFI, AFR, AFS, AFY, ATS BEA, BOG, BHP, CAN, EMT, FAU, GME, LTL, MAZ, MOR, MTW, OFF, and ROG. The structures indicated by these capital codes are well known to the person skilled in the art and are for example defined and described in Colloid Polym. Science 270: pp. 711–715 (1992) and W. M. Meier and D. H. Olson Atlas of Zeolite Structure Types, 3rd Ed. 1992 Rutterworth-Heinemann, London (1992) ISBN 0-7506-9331-2.

The zeolite which is preferably used as an adsorbent is zeolite Y. The present process is particularly suitable for the removal of iron carbonyl and/or nickel carbonyl and/or cobalt carbonyl from gaseous streams and more in particular from synthesis gas. The present process is preferably used for the removal of metal carbonyls from synthesis gas which is obtained from the partial oxidation of coal and/or liquid hydrocarbons and/or emulsion of hydrocarbons.

For large scale applications of the adsorbents according to the present invention it is much more practical to apply extrudates instead of powders. Therefore, the zeolite is suitably used in the form of an extrudate comprising small zeolite particles and a binder. The zeolite particles are suitably between 0.01 and 100 micron, preferably between 0.1 and 50 micron, more preferably between 0.5 and 20 micron, especially between 1 and 10 micron. The binder may be a binder well known in the art, e.g. a binder which is known from fluid catalytic cracking (FCC). Suitably alumina, silica or silica/alumina may be used. The amount of binder is suitably between 5 and 80 wt % of the total composition, especially between 10 and 50 wt %. 15–25 wt % gamma-alumina is a preferred binder in view of its good extrusion properties. Usually the binder will have an amorphous structure. To prevent any diffusion problems, the binder will have relatively large pores when compared with the zeolites, especially macropores and/or mesopores, i.e. pores larger than 2 nanometers. Suitably the binder will have pores between 3 and 500 nanometers, especially between 5 and 100 nanometers. The preparation of the above mentioned extrudates is well known in the art, especially prior art relating to FCC. The nominal diameter of the extrudates is suitably between 0.5 and 10 mm, preferably between 1 and 5 mm, more preferably between 1.5 and 4 mm. The length is suitably 1 to 40 mm, preferably 2 to 30 mm, especially 3 to 15 mm. The weight ratio between zeolite and binder is suitably between 20 and 0.1, preferably between 10 and 1. The extrudates may have any suitable shape, e.g. round, trilobes and rings. Another possibility (to be considered as an equivalent of the extrudates as discussed above) to avoid the use of powders is the use of pellets, balls, pills or rings made from zeolite particles and binder as described above. Conventional techniques well known in the art can be used to produce these pellets etc. The difference between these alternatives and the extrudates described above concerns the way of preparation.

The present invention concerns a process for the removal of metal carbonyl from a gaseous stream containing water and/or hydrogen sulphide using a microporous adsorbent with an accessible pore volume for pore sizes between 0.55 and 4 nm of at least 0.005 ml/g, the microporous material being an oxide and more in particular a Si and/or Al containing zeolite. The silica/alumina ratio is preferably at least 25. Particular good results are obtained with a SAR of at least 50, especially at least 75. A suitable upper limit is 1000, especially 600.

The process is further preferably used prior to passing the synthesis gas to a process unit for the removal of hydrogen sulphide and/or $CO_2$ from the synthesis gas. In particular the process is used prior to passing the synthesis gas to a Rectisol unit and/or Sulfinol unit, in which hydrogen sulphide and/or $CO_2$ are removed from the synthesis gas. Accordingly the present invention also relates to these respective uses of the present metal carbonyl removal process.

As described herein the present invention is particularly suitable for the removal of metal carbonyl from carbon monoxide and/or synthesis gas and is therefore also related to respectively the carbon monoxide and the synthesis gas so obtained.

Still further the synthesis gas from which metal carbonyl is removed is particularly suitable for use as feedstock for a hydrogen plant or a petrochemical plant, such as a methanol plant or a plant for the production of hydrocarbons. Therefore the present invention also relates to these respective uses.

The carbon monoxide from which metal carbonyl is removed using the present process, is particularly suitable for use as a feedstock for a petrochemical plant, preferably a plant for the production of a CO based polymer. Accordingly the present invention also relates to these respective uses.

The present invention will now be further described in more detail with reference to the following examples.

EXAMPLE 1

The adsorption of iron pentacarbonyl and nickel tetracarbonyl was studied using the gas phase as described in Table 1.

TABLE 1

Composition of the gas phase

| Compound | Concentration | Remarks |
|---|---|---|
| $Fe(CO)_5$ | 250 ppmV | |
| $Ni(CO)_4$ | 50–200 ppmV | constant during experiment. Varied in between the experiments. |
| $H_2S$ | 0,0.2% V | |
| $H_2O$ | 0,1.5% | |
| CO | 50% V | |
| $H_2$ | 40% V | |
| He | approx. 10% V | from carbonyl saturators |
| Total pressure | 1 bar | |
| Space velocity (GHSV) | 6000 $h^{-1}$ | |

In a typical experiment 1 ml of the adsorbent (particle size; sieve fraction 0.425–0.800 mm) to be tested was loaded in a glass tubular reactor (diameter 10 mm, length 150 mm) and the gas phase without the metal carbonyls present was admitted to the reactor. Once the adsorbents were saturated with water and hydrogen sulphide—as monitored by on line measurement using mass spectrometry; influent concentration is effluent concentration)—the metal carbonyls were introduced to the gas phase and their concentration was monitored upstream and downstream of the reactor using on line UV-VIS spectrometry. The gas hourly space velocity (GHSV NL/L.h) was set at 6000 $h^{-1}$. The equilibrium capacity of the adsorbents for iron pentacarbonyl and nickel tetracarbonyl is reached when the reactor outlet concentration is equal to the reactor inlet concentration. The results for a number of hydrophobic adsorbents with a suitable pore structure are given in Table 2.

TABLE 2

Capacity of adsorbents for $Fe(CO)_5$ and $Ni(CO)_4$

| Adsorbent | Pore volume (ml/g) | Pore size (nm) | SAR* | Equilibrium capacity (% m) | |
|---|---|---|---|---|---|
| | | | | $Fe(CO)_5$ | $Ni(CO)_4$ |
| Faujasite | 0.25 | 0.74 <111> | 80 | 14.9 | 2.9 |
| Faujasite | 0.28 | 0.74 <111> | 91 | 22.3 | 2.8 |
| Zeolite β | — | 0.75 × 0.64 [001] 0.55 × 0.55 [100] | 300 | 8.0 | n.m. | n.m. = not measured
*SAR = silica alumina ratio
< > means 3 dimensional pores
[ ] means 2 dimensional pores This example clearly demonstrates that hydrophobic adsorbents with the claimed pore size show a high capacity for both $Fe(CO)_5$ and $Ni(CO)_4$ in the presence of both water and hydrogen sulphide.

EXAMPLE 2

In this experiment the influence of the concentration of both hydrogen sulphide and water in the gas phase on the capacity of Faujasite for the adsorption of $Fe(CO)_5$ and $Ni(CO)_4$ was studied. First a gas phase was used as in example 1 but without the presence of hydrogen sulphide and water. Water and both water and hydrogen sulphide were added in further tests. The results for Faujasite (see entry 2, Table 2) are collected in Table 3.

TABLE 3

Capacity of Faujasite for $Fe(CO)_5$ under various conditions

| Gas phase composition | SAR Faujasite | Equilibrium capacity for $Fe(CO)_5$ (% m) |
|---|---|---|
| no $H_2O$ and no $H_2S$ | 91 | 24.0 |
| $H_2O$ present, no $H_2S$ | 91 | 23.0 |
| $H_2S$ and $H_2O$ present | 91 | 22.3 |
| no $H_2S$ and no $H_2O$ | 5 | 30.3 |
| $H_2S$ and $H_2O$ present | 5 | 1.0 |

This example clearly demonstrates that for a hydrophobic adsorbent (as indicated by the high SAR) the capacity of the adsorbent for $Fe(CO)_5$ is not affected by the presence in the gas phase of both water and hydrogen sulphide. This example also illustrates clearly that when use is made of an hydrophilic adsorbent (SAR=5) with the same pore structure the capacity of the adsorbent is strongly affected by the presence of water and hydrogen sulphide in the gas phase.

From Zeolites, vol. 12, pp 155–159, 1992, Simonot-Grange, H. H. cs., it is known that the adsorption of zeolites at a SAR of about 30 becomes very small.

EXAMPLE 3

Using the method and the equipment of sample 1 the influence of the required (average) pore size of the adsorbent was studied. Results of the experiments are collected in Table 4.

TABLE 4

Capacity of various absorbents for $Fe(CO)_5$ and $Ni(CO)_4$

| Adsorbent | Pore volume (ml/g) | Pore size (nm) | Equilibrium capacity (% m) | |
|---|---|---|---|---|
| | | | $Fe(CO)_5$ | $Ni(CO)_4$ |
| Mordenite | 0.2 | 0.65 × 0.70 [001] 0.26 × 0.57 [010] | 1.0 | 0.01 |
| ZMS-5 | 0.08 | 0.53 × 0.56 [010] 0.51 × 0.55 [100] | 0.2 | <0.01 |
| $MCM_{41}$ | | 3.0 × 3.5 | 4.2 | <0.01 |

This example demonstrates that if the pore size is too small (Mordenite and ZMS-5) the capacity for both $Fe(CO)_5$ and $Ni(CO)_4$ is negligible. An adsorbent with large pores (but within the range claimed) still shows some capacity for $Fe(CO)_5$. This clearly shows that if the pores are too small no capacity for the adsorption of both $Fe(CO)_5$ and $Ni(CO)_4$ was observed.

EXAMPLE 4

Using the method and the equipment as described in example 1 we studied the adsorption capacity of the amorphous porous materials $Al_2O_3$ and $SiO_2$ both exhibiting a high surface area (300–400 $m^2$/g). To increase their hydrophobic nature the active hydroxyl groups were silylated by reaction with hexamethyldisiloxane (HMDSo). Both treated and untreated materials were tested and the results are collected in Table 5.

TABLE 5

Capacity of various adsorbents for Fe (CO)$_5$

| Absorbent | Equilibrium capacity Fe (CO)$_5$ (% m) | Remarks |
|---|---|---|
| SiO$_2$ | 0.3 | wide pore size distribution |
| SiO$_2$ (HMDSo treated) | <0.01 | hydrophobic by treatment |
| Al$_2$O$_3$ | 0.7 | wide pore size distribution |
| Al$_2$O$_3$ (HMDSo treated) | 0.3 | hydrophobic by treatment |

In this example it is clearly illustrated that a porous adsorbent with a wide-non defined-pore size distribution shows only a very limited capacity for Fe(CO)$_5$, indicating the importance of the pore size as claimed in claim 1. Furthermore it shows that only increasing the hydrophobic nature of the adsorbent does not give the desired capacity for carbonyl adsorption. A combination of pore size and hydrophobicity is essential.

EXAMPLE 5

In a separate experiment it was investigated if the external surface of the crystalline adsorbents claimed could be responsible for the observed adsorption capacity for metal carbonyls. For that purpose we tested Zeolite Hβ (SAR=22) in which the template was still present (pores completely filled). It was found that the capacity for Fe(CO)$_5$ adsorption was only 0.6%m, whereas after removal of the template —by calcination in air at 450°°C.—the capacity increased to 9.8%m, indicating the importance of the pore size (Hβ 2D 0.76×0.64 nm; 5.5×5.5 nm) and volume.

EXAMPLE 6

In this example the influence of binder materials as to the adsorption properties of faujasite was investigated. For this purpose—using the method and equipment as described in example 1 (except c(H$_2$S)=0%v, c(H$_2$O)=3%v)—we studied the influence of alumina and silica as a binder material on the adsorption capacity of faujasite with a SAR of 91. Extrudated samples containing either 20%w silica or 20%w alumina were used. The results of these experiments are collected in Table 6.

TABLE 6

Capacity for Fe (CO)$_5$ of faujasite with a SAR of 91

| Adsorbent | Equilibrium Capacity % m |
|---|---|
| FAU | 21 |
| FAU-20% m Al$_2$O$_3$ | 20 |
| FAU-20% w SiO$_2$ | 20 |

We claim:

1. A process for the removal of metal carbonyl from a gaseous stream in the presence of components selected from the group of hydrogen sulphide and water, the process including the steps of:

contacting the gaseous stream with a hydrophobic porous adsorbent, the hydrophobic porous adsorbent having an accessible pore volume for pore sizes between 0.55 and 4 nm of at least 0.005 ml/g; and recovery of a product stream from which at least a portion of the metal carbonyl has been removed.

2. The process of claim 1, wherein the gaseous stream comprises carbon monoxide.

3. The process of claim 2, wherein the gaseous stream comprises synthesis gas.

4. The process of claim 1 in which the hydrophobic porous adsorbent is an oxide.

5. The process of claim 4 in which the oxide is selected from the group consisting of Si and Al containing zeolites.

6. The process of claim 5 in which the zeolite has a silica/alumina ratio of at least 25 and the accessible pore volume for pore sizes between 0.55 and 2 nm is at least 0.02 ml/g.

7. The process of claim 5 in which the structure of the zeolite is selected from the group consisting of CLO, VFI, AET, AFI, AFR, AFS, AFY, ATO, ATS, BEA, BOG, BHP, CAN, EMT, FAU, GME, LTL, MAZ, MEI, MOR, MTW, OFF and ROG, and zeolite Y.

8. The process of claim 1 in which the metal carbonyl is selected from the group consisting of iron carbonyl, nickel carbonyl, cobalt carbonyl and mixtures thereof.

9. The process of claim 1 in which the porous adsorbent is an extrudate of the adsorbent and a binder.

10. The process of claim 1 further comprising the step of passing the produced gas to a process for the removal of the hydrogen sulphide and/or CO$_2$ to produce a purified gas.

11. The process of claim 10 wherein the gaseous stream comprises synthesis gas.

12. The process of claim 11 further comprising the step of feeding the purified gas to a process selected from the group consisting of a hydrogen plant, a methanol plant, a petrochemical plant, a plant for the production of hydrocarbons, and a process for the production of a CO based polymer.

* * * * *